Feb. 7, 1950     C. W. HELLBERG     2,496,792
COMBINED COFFEE BREWER COVER AND STAND
Filed Jan. 3, 1947
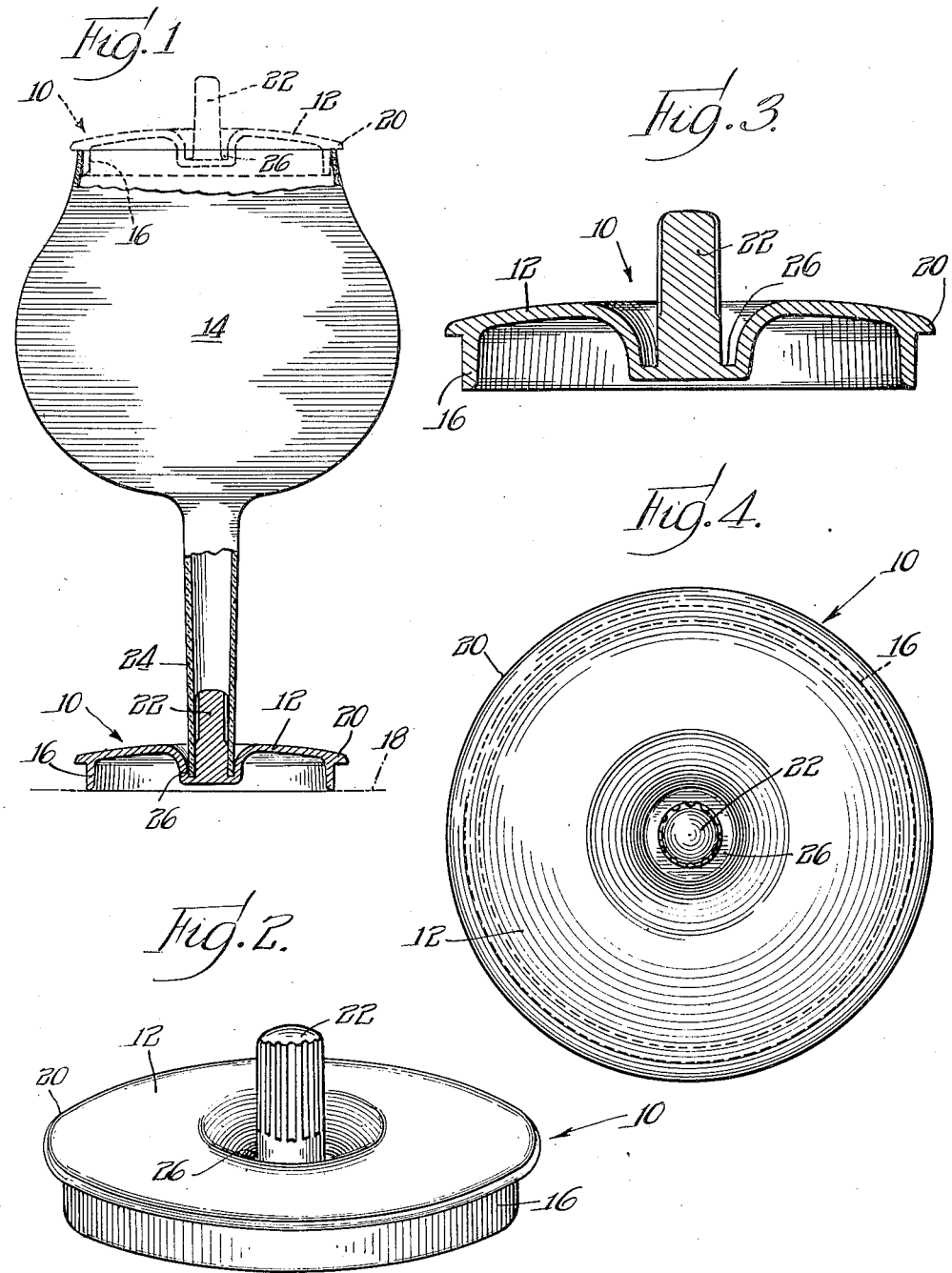
INVENTOR.
Carl W. Hellberg
BY
Moore, Olson & Trexler
Attys.

Patented Feb. 7, 1950

2,496,792

UNITED STATES PATENT OFFICE 2,496,792

COMBINED COFFEE BREWER COVER AND STAND

Carl W. Hellberg, Chicago, Ill.

Application January 3, 1947, Serial No. 720,073

3 Claims. (Cl. 65—65)

This invention relates to coffee brewers, and has for its object the provision of an improved device to serve as a combination cover and stand for the upper bowl of a vacuum coffee brewer.

A further object is to provide a novel coffee brewer bowl cover formed to hold the depending bowl stem at the lower end thereof, whereby the cover may be used as a stand for supporting the bowl in upright position.

A still further object is to enable a cover for the upper bowl of a coffee brewer to be used as a stand for the bowl by providing a closure member which affords a supporting base when seated on a substantially level surface, and which has an upwardly projecting handle formed to fit snugly within the lower portion of the depending bowl stem, the closure member also being provided with an annular channel surrounding the base of the handle for receiving the lower end of the stem.

Various other objects, advantages and features of the invention will be apparent from the following specification when taken in connection with the accompanying drawing wherein a certain preferred embodiment is set forth for purposes of illustration.

In the drawing, wherein like reference numerals refer to like parts throughout:

Fig. 1 is a view partially in elevation and partially in vertical section, illustrating a combination cover and stand in association with the upper bowl of a coffee brewer, the device being constructed in accordance with and embodying the principles of the invention;

Fig. 2 is a perspective view of the combination bowl cover and stand shown in Fig. 1, drawn to a different scale;

Fig. 3 is a view of the device in vertical section on the same scale as Fig. 2; and Fig. 4 is a plan view of the device on the same scale as Fig. 2.

As shown in the drawing, the device 10, which I propose to use as a combination bowl cover and stand, comprises a body portion 12 which serves as a closure member for the mouth of the bowl 14 as indicated in broken lines in Fig. 1. An annular flange or rim 16 depending from the body portion 12 is adapted to fit inside the rim of the bowl mouth. The flange 16 also serves to support the device on a level surface as 18, Fig. 1, when the device is being used as a stand for the upper bowl 14. An annular lip 20 overhanging the flange 16 supports the device 10 on the bowl rim when it is being used as a cover for the bowl 14.

A cylindrical handle 22, preferably integral with the closure member 12, projects upwardly from the center of the bowl cover 10. The outer diameter of the handle 22 is substantially equal to the inner diameter of the lower end portion of the depending bowl stem 24, whereby the handle 22 fits snugly within the stem 24 when the device 10 is being used as a stand. The portion of the closure member 12 surrounding the base of the stem 22 is depressed to afford an annular channel 26 having a width approximately equal to the thickness of the wall of the bowl stem 24 at the lower end thereof. Thus, the lower end portion of the stem 24 is gripped firmly between the handle 22 and the wall of the channel 26 when the device 10 is being used to support the bowl 14. The arrangement is such that tipping of the bowl 14, due to ordinary overbalancing forces acting upon it, is avoided. Such liquid as may drain from the bowl 14 and collect in the channel 26 is readily removed by rinsing the cover 10.

The handle 22 may be fluted as shown to facilitate grasping it. As is apparent from the foregoing description, it serves the dual purpose of a finger grip for the cover 10 and a holder for the stem 24. The handle need not be of the length shown, inasmuch as adequate support for the bowl may be afforded by having a short handle and making the walls of the channel 26 higher, or by having a longer handle with a more shallow channel or no channel.

The present invention eliminates the need for providing separate devices to serve as the cover and supporting stand, respectively, for the upper bowl of a vacuum coffee brewer. The combination device is simple in construction and inexpensive to manufacture. It may be formed as a single piece of molded plastic or other suitable material.

Obviously various changes may be made in the specific embodiment set forth for purposes of illustration without departing from the principles of the invention. The invention is accordingly not to be limited to the precise details disclosed herein but includes all modifications thereof within the spirit and scope of the appended claims.

The invention is hereby claimed as follows:

1. A combination cover and stand device for a coffee brewer bowl having an open topped bowl portion and a depending tubular stem, and comprising a closure portion having a substantially horizontal ledge portion adapted to seat on the edge of the bowl around the open top thereof for closing the same, and having a depending substantially peripherally disposed portion engageable with the bowl for centering the device in bowl closing position, said closure portion having a central depression defined by bottom and annular wall portions, and a cylindrical handle member upstanding centrally from the bottom wall portion of said depression and spaced within the annular wall portion thereof a distance approximating the thickness of the wall of the tubular stem to form an annular channel within which the end of said tubular stem snugly fits when placed over said handle member with the inner surface of the stem snugly engaging said handle member for stable support on the device with its depending portion resting upon a supporting surface.

2. A combination cover and stand device for a coffee brewer bowl having an open topped bowl portion and a depending hollow stem, and comprising a closure portion engageable at the edge of the bowl portion for closing the same and including depending means disposed adjacent the periphery thereof, said closure portion having a central depression defined by bottom and annular side wall portions, and a cylindrical handle member upstanding centrally from the bottom wall portion of said depression and spaced within the annular side wall portion thereof a distance approximating or slightly greater than the thickness of the wall of the hollow stem to form an annular channel within which the end of the hollow stem is adapted to snugly fit when placed over said handle member with the inner surface of the stem engaging said handle member for stable support on the device with the depending means adjacent the periphery thereof resting on a supporting surface.

3. A combination cover and stand device for a coffee brewer bowl having an open topped bowl portion and a depending hollow stem, and comprising a closure portion engageable with the edge of the bowl portion for closing the same and including depending means disposed adjacent the periphery thereof, said closure portion having a central recess defined by bottom and annular side wall portions and a handle member upstanding centrally from the bottom wall portion of said recess and spaced within the annular side wall portion thereof to form an annular channel within which the end of the hollow stem is inserted when placed over the handle member with the walls of the stem adapted to be engaged between the handle member and the annular side wall portion for stable support against tilting when the depending means adjacent the periphery of the device rests upon a supporting surface.

CARL W. HELLBERG.

REFERENCES CITED

The following references are of record in the file of this patent:

UNITED STATES PATENTS

| Number | Name | Date |
|---|---|---|
| Re. 20,302 | Cory | Mar. 23, 1937 |
| 797,314 | Owens | Aug. 15, 1905 |
| 893,469 | Essmuller | July 14, 1908 |
| 1,163,015 | Keller | Dec. 7, 1915 |
| 1,478,026 | Dalzell | Dec. 18, 1923 |
| 1,509,524 | Morrison | Sept. 23, 1924 |
| 1,666,389 | Mander | Apr. 17, 1928 |
| 1,977,366 | Wolcott | Oct. 16, 1934 |
| 2,041,563 | Meinecke | May 19, 1936 |
| 2,112,944 | Wolcott | Apr. 5, 1938 |
| 2,137,884 | Weeks | Nov. 22, 1938 |
| 2,331,705 | Lehmann | Oct. 12, 1943 |
| 2,372,872 | Wolper | Apr. 3, 1945 |

FOREIGN PATENTS

| Number | Country | Date |
|---|---|---|
| 15,022 | Great Britain | Aug. 22, 1900 |
| 444,421 | Great Britain | Mar. 20, 1936 |